(12) United States Patent
Willis et al.

(10) Patent No.: US 11,047,695 B2
(45) Date of Patent: Jun. 29, 2021

(54) VEHICLE ASSESSMENT (71) Applicant: BlackBerry Limited, Waterloo (CA)

(72) Inventors: Edward Snow Willis, Ottawa (CA);
Andrew Kugler, Ottawa (CA); Paulo
Eduardo Garcia, Kanata (CA)

(73) Assignee: BlackBerry Limited, Waterloo (CA)

( * ) Notice: Subject to any disclaimer, the term of this
patent is extended or adjusted under 35
U.S.C. 154(b) by 170 days.

(21) Appl. No.: 16/283,245

(22) Filed: Feb. 22, 2019

(65) Prior Publication Data
US 2020/0271469 A1 Aug. 27, 2020

(51) Int. Cl.
G01C 21/34 (2006.01)
G07C 5/08 (2006.01)

(52) U.S. Cl.
CPC ....... *G01C 21/3461* (2013.01); *G07C 5/0808* (2013.01)

(58) Field of Classification Search
CPC .......... G01C 21/3461; G07C 5/0808;
G07C 5/0816; G07C 5/008; B60W
1555/40; B60W 2520/10; B60W 2520/14;
B60W 2555/20; B60W 2556/50; B60W
2556/45; B60W 2556/10; B60W 2556/05;
B60W 40/08; B60W 40/09
See application file for complete search history.

(56) References Cited

U.S. PATENT DOCUMENTS

| 5,420,794 | A | 5/1995 | James |
| 7,139,660 | B2 | 11/2006 | Sarkar |
| 7,685,162 | B2 | 3/2010 | Heider |
| 7,873,452 | B2 | 1/2011 | Hawkins et al. |
| 8,554,468 | B1 * | 10/2013 | Bullock ............ B60W 50/0097 701/408 |
| 8,560,155 | B2 | 10/2013 | Kedar-Dongarkar et al. |
| 9,079,505 | B1 | 7/2015 | Hyde et al. |
| 9,428,197 | B2 | 8/2016 | Chen |
| 2005/0274553 | A1 | 12/2005 | Salman et al. |
| 2012/0323413 | A1 | 12/2012 | Kedar-Dongarkar |

(Continued)

FOREIGN PATENT DOCUMENTS

| EP | 1652128 | 5/2006 |
| EP | 2165321 | 3/2010 |

(Continued)

OTHER PUBLICATIONS

AA1CAR, Engine Coolant Sensors dated on or before Feb. 2017 (13 pages).

(Continued)

*Primary Examiner* — Marthe Y Marc-Coleman
(74) *Attorney, Agent, or Firm* — Trop, Pruner & Hu, P.C.

(57) ABSTRACT

A system determines a baseline of at least one route segment based on measurement data received from a plurality of vehicles. The system receives first measurement data of a first vehicle that has traveled along the at least one route segment, and compares the first measurement data to the baseline. Based on the comparing, the system determines whether operation of the first vehicle is within an acceptable tolerance of a performance criterion, and determines whether the at least one route segment is an undesirable route segment according to a route criterion.

20 Claims, 3 Drawing Sheets

(56) References Cited

U.S. PATENT DOCUMENTS

| | | | |
|---|---|---|---|
| 2014/0195100 A1* | 7/2014 | Lundsgaard | G06Q 50/30 701/29.6 |
| 2016/0171521 A1 | 6/2016 | Ramirez et al. | |
| 2016/0200166 A1 | 7/2016 | Stanek et al. | |
| 2017/0137026 A1 | 5/2017 | Hemes | |
| 2018/0059687 A1 | 3/2018 | Hayes et al. | |
| 2018/0297607 A1 | 10/2018 | Willis | |
| 2018/0297608 A1 | 10/2018 | Willis | |

FOREIGN PATENT DOCUMENTS

| | | |
|---|---|---|
| WO | 2012173881 A1 | 12/2012 |
| WO | 2016100668 | 6/2016 |
| WO | 2017/066875 A1 | 4/2017 |

OTHER PUBLICATIONS

Chris Perkins, Koenigsegg Can Remotely Adjust the Suspension on Their Cars From Anywhere in the World, Dec. 13, 2016 (10 pages).

European Patent Office, Appl. No. 18306363.5 entitled Route-Based Selections of Vehicle Parameter Sets filed Oct. 17, 2018 (31 pages).

Morgan, Jason, How data-driven telematics systems can improve your current trucks, Nov. 2017 (7 pages).

Fletcher, Lauren, How to Leverage Constantly Evolving Fleet Analytics, Jul. 17, 2015 (21 pages).

McCarthy, Dave, Tapping the IoT to improve truck operations, Technology, Driving value through vehicle data, Aug. 27, 2017 (11 pages).

Carpatorea, Halmstad University, Methods to quantify and qualify truck driver performance, 2017 (64 pages).

European Patent Office, Extended European Search Report for Appl. No. 20158261.6 dated Jul. 13, 2020 (10 pages).

\* cited by examiner

VEHICLE ASSESSMENT

BACKGROUND

A vehicle such as a car or other type of vehicle can be used to carry people or goods from one location to another location. In some examples, sensors can be included in a vehicle to monitor various properties associated with the vehicle.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A vehicle can refer generally to any machine that is used to carry people, goods, and/or other payload from one physical location to another physical location. A vehicle can be driven by a human driver, or can be an autonomous vehicle that is able to drive itself. Examples of vehicles include any or some combination of the following: a truck, a trailer, a tractor, a car, a railed vehicle (e.g., a train), a watercraft (e.g., a ship, a submarine), an aircraft, a spacecraft, and so forth. A vehicle can also refer to a drone, which is an un-manned vehicle that can be used to perform various different actions. A vehicle can include wheels to move between different physical locations over land. Alternatively, a vehicle can include structures such as wings to allow the vehicle to fly through the air, or floatation structures to sail on or through water.

A vehicle can include various sensors to measure various properties related to the vehicle. The sensors for measuring the properties can include one or more of: an accelerometer to measure acceleration of the vehicle, a gyroscope to measure rotation of the vehicle, a speedometer to measure a speed of the vehicle, a location sensor (e.g., a Global Positioning System (GPS) receiver that provides location data of the vehicle), a temperature sensor to measure a temperature of an environment around the vehicle, an altitude sensor to measure an altitude of the vehicle, a terrain-detecting sensor to determine the type of terrain over which the vehicle is travelling, a distance sensor to determine a travel distance of the vehicle, fuel consumption sensor, a camera to capture still images or video images, or any other type of sensor.

In some examples, a fleet operator can operate a collection comprising multiple vehicles. A fleet operator can refer to an individual human or to an enterprise such as a business concern, an educational organization, a government agency, a charitable organization, or any other type of organization.

The fleet operator may wish to determine whether the fleet operator's vehicles are operating efficiently and/or are operating in environments that are not placing undue stress on the vehicles or subjecting the vehicles (or drivers of the vehicles) to undue risk due to crime. In some examples, the fleet operator may assign humans to manually monitor performance-related data and possibly other data to make an assessment of operations and environments of the vehicles. Such manual assessments are labor-intensive, time-consuming, and may not produce accurate results and may not reflect changing conditions of routes.

A "route" can refer to a path including roads (e.g., city roads, highways, etc.) over which a vehicle travels. A route is made up of one or more route segments. A route segment can refer to a part of the route, or an entirety of the route. For example, a route can include a first route segment that includes local roads (also referred to as "inner-city roads") of a first city, a second route segment that includes a first highway, a third route segment that includes a second highway, and a fourth route segment that includes local roads (or "inner-city roads") of a second city.

In accordance with some implementations of the present disclosure, a system is able to automatically assess performance and environments of vehicles to determine poor operation of vehicles (which can be due to poor operation by drivers or due to the vehicles performing poorly resulting from lack of maintenance or defective components) and determine route segments that are undesirable. If the system determines that a driver is operating a vehicle poorly, then the system can issue a notification, such as to the driver and/or to a fleet operator, that the driver should be subject to further training. If the system determines that the vehicle is performing poorly, then the system can issue a notification, such as to the fleet operator, that the vehicle should be scheduled for maintenance or repair. The determination of whether or not a driver is operating a vehicle poorly or a vehicle is performing poorly can be based on evaluating measurement data acquired from one or more vehicles with respect to a performance criterion (discussed further below).

If the system determines that a route segment is undesirable, the system can use that determination in performing route segment selections for selecting future route segments of routes for vehicles. The determination of whether or not a route segment is undesirable can be based on evaluating measurement data acquired from one or more vehicles with respect to a route criterion (discussed further below)

Figure 1:
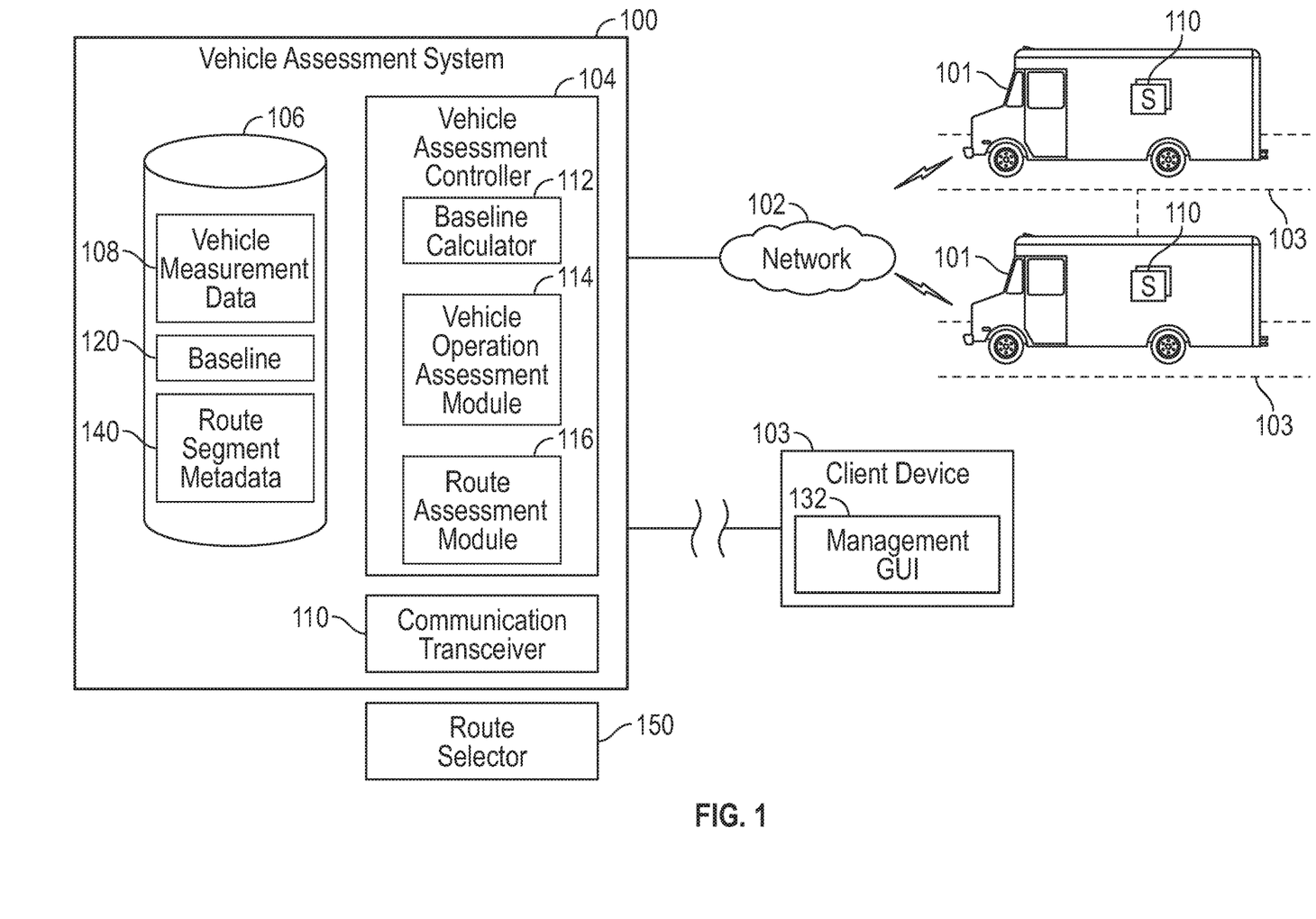
FIG. 1 is a block diagram of an example arrangement that includes a vehicle assessment system, vehicles, a client device, and a route selector, in accordance with some implementations of the present disclosure.

FIG. 1 is a block diagram of an example arrangement that includes a vehicle assessment system 100 that can be used to assess performance of vehicles 101 and route segments 103 over which the vehicles 101 can travel. The vehicle assessment system 100 is able to communicate with the vehicles 101 over a network 102, which can be a wireless network or a wired network.

A wireless network can include a cellular access network or a wireless local area network (WLAN). An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) new radio (NR) or beyond cellular networks.

A WLAN can operate according to the Institute of Electrical and Electronic Engineers (IEEE) 802.11 or Wi-Fi Alliance Specifications. In other examples, other types of wireless networks can be employed, such as a Bluetooth link, a ZigBee network, and so forth. Additionally, some wireless networks can enable cellular Internet of Things (IoT), such as wireless access networks according to LTE Advanced for Machine-Type Communication (LTE-MTC), narrowband IoT (NB-IoT), and so forth.

The vehicle assessment system 100 includes a vehicle assessment controller 104 that is able to perform assessment of the vehicles 101 and the route segments 103.

As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit. The vehicle assessment controller 104 can be implemented using a computer or a collection of computers, for example.

A storage medium 106 stores various data. The storage medium 106 can be implemented with a disk drive, a collection of disk drives, a solid-state memory, a collection of solid-state memories, and/or other types of storage media. The storage medium 106 can be part of the vehicle assessment system 100, or can be remote from the vehicle assessment system 100, but is accessible by the vehicle assessment system 100, such as over the network 102.

The vehicle assessment system 100 also includes a communication transceiver 110 that allows the vehicle assessment system 100 to communicate over the network 102 with the vehicles 101. The communication transceiver 110 can include a wireless transceiver to transmit and receive wireless signals, or a wired transceiver to communicate over a wired network.

The data stored in the storage medium 106 can include vehicle measurement data 108 received from the vehicles 101, which may be operated by one or multiple fleet operators. The vehicle measurement data 108 can be acquired by sensors 110 of the vehicles 101.

The sensors 110 for measuring properties related to the vehicles 101 can include one or more of: an accelerometer to measure acceleration of the vehicle, a speedometer to measure a speed of the vehicle, a location sensor (e.g., a Global Positioning System (GPS) receiver that provides location data of the vehicle), a temperature sensor to measure a temperature of an environment around the vehicle, a humidity sensor to measure a humidity of an environment around the vehicle, a pressure sensor to measure a pressure of an environment around the vehicle, an altitude sensor to measure an altitude of the vehicle, a terrain-detecting sensor to determine the type of terrain over which the vehicle is travelling, a distance sensor to determine a travel distance of the vehicle, fuel consumption sensor, a camera to capture still images or video images, or any other type of sensor.

An accelerometer can measure acceleration of a vehicle in various different directions. The acceleration of the vehicle can indicate any one or more of the following example scenarios: the vehicle is traveling along a route segment with gradual turns or with sharp turns and twists, the vehicle is traveling along a route segment with smooth pavement or a rough surface (e.g., the route segment is not paved or has a lot of potholes), the vehicle is traveling along a route segment with heavy traffic that causes the vehicle to change speeds frequently (e.g., stop and start movement in heavy traffic), and so forth.

A location sensor such as a GPS receiver can be used to measure a speed of a vehicle and/or a distance traveled by the vehicle.

A distance sensor can include a location sensor or a speedometer.

A terrain-detecting sensor can include a camera to capture an image of the terrain, and to detect the type of terrain based on image processing of the captured image of the terrain. Alternatively or additionally, the terrain-detecting sensor can include a shock or vibration sensor to detect a force or vibration exerted on the vehicle as the vehicle moves over the pavement, which can give an indication of the type of terrain. A terrain-detecting sensor can also measure the slope of the road on which the vehicle is traveling.

A fuel consumption sensor can measure an amount of fuel consumed by a vehicle.

The vehicle measurement data 108 can be in the form of a dataset, such as a database or other data repository. Each measurement data entry in the vehicle measurement data 108 of the dataset can be associated with respective attributes, including a route segment attribute to identify a route segment for which the measurement data in the measurement data entry was acquired. Stated differently, the route segment attribute identifies the route segment over which a vehicle 101 traveled while the sensors 110 of the vehicle 101 acquired the respective measurement data. As an example, the route segment attribute can include a name of the route segment (e.g., Highway 59, Interstate 45, 5th Avenue, etc.). Alternatively, the route segment attribute can include geographic coordinates to identify a location of the route segment, intersection information (e.g., from intersection X to intersection Y), and extent information to identify a length of the route segment. Other forms of the route segment attribute can be used in other examples.

Another attribute associated with a measurement data entry can include an identifier of a vehicle 101, such as the vehicle identification number (VIN) of the vehicle 101, a license plate of the vehicle 101, a vehicle number assigned by a fleet operator, or any other identifier that can be used to uniquely identify the vehicle 101.

A further attribute associated with a measurement data entry includes a time attribute, such as a timestamp at which the measurement data of the measurement data entry was acquired.

Each measurement data entry can include various different measurement data acquired by respective sensors 110, include acceleration data, and/or the various other data acquired by the example sensors discussed further above.

The vehicle assessment controller 104 includes a baseline calculator 112 that is able to calculate a baseline 120 based on the vehicle measurement data 108. The baseline calculator 112 can be part of the hardware processing circuit of the vehicle assessment controller 104, or the baseline calculator 112 can include machine-readable instructions executable by the vehicle assessment controller 104.

A baseline calculated by the baseline calculator 112 can include an aggregate (e.g., a sum, an average, a median, a maximum, a minimum, etc.) of measurement data acquired by multiple vehicles 101 from one or more fleet operators. For example, an acceleration baseline can be based on an aggregate of acceleration data acquired by accelerometers of multiple vehicles 101. As another example, a speed baseline can be based on an aggregate of speed data acquired by of multiple vehicles 101. As a further example, a distance baseline can be based on an aggregate of distances acquired by multiple vehicles 101.

The foregoing provides examples of different baselines calculated by aggregating respective different types of measurement data (e.g., acceleration data, speed data, distance data, etc.). In further examples, a baseline can be calculated by aggregating multiple types of measurement data, e.g., an aggregate of acceleration data and distance data.

In other examples, the aggregation for calculating the baseline is based on measurement data received from multiple vehicles that have traveled along one or more route segments that are in the same category or of the same type. In such examples, the vehicle assessment controller 104 can assign route segments to respective categories of route segments, including any one or more of: a city route category (a route segment that includes a city local road), a highway route category (a route segment that includes a highway), an unpaved route category (a route segment that is not paved), a paved route category (a route segment that is paved), a high altitude route category (a route segment at an altitude higher than a threshold altitude), a low altitude route category (a route segment at an altitude lower than a threshold altitude), a steep incline route category (a route segment that has a steep incline of greater than a specified grade), a flat route category (a route segment that has an incline less than a specified grade), and so forth. Each route segment can be associated with a category attribute, which can be part of route segment metadata 140 stored in the storage medium 106 (FIG. 1). The category attribute is assigned one of various different values that correspond to one of various respective different categories. For example, if the category attribute of a route segment is assigned a first value, then that indicates the route segment belongs to a first route category. On the other hand, if the category attribute of a route segment is assigned a second value different from the first value, then that indicates the route segment belongs to a second route category different from the first route segment.

In order to calculate the baseline, the baseline calculator 112 determines a baseline for each category (or categories) of route segments. The baseline calculator 112 retrieves, from the vehicle measurement data 108, the measurement data acquired by vehicles as the vehicles traveled along the one or more other route segments that belong to the same category (or categories), and aggregates such measurement data to compute the baseline for each category.

The baseline 120 is stored in the storage medium 106, and is used for comparing to measurement data acquired for a specific vehicle or a group of vehicles. For example, the vehicle assessment controller 104 includes a vehicle operation assessment module 114 and a route assessment module 116 that can compare the measurement data of a specific vehicle or group of vehicles to the baseline 120. Each of the vehicle operation assessment module 114 and the route assessment module 116 can include a part of the hardware processing circuit of the vehicle assessment controller 104, or each of the vehicle operation assessment module 114 and the route assessment module 116 can include machine-readable instructions executable by the vehicle assessment controller 104.

The vehicle operation assessment module 114 compares the measurement data of a vehicle (an individual vehicle or group of vehicles) to determine whether operation of the vehicle is poor (sub-par in comparison to the baseline 120) according to a performance criterion. Stated differently, the vehicle operation assessment module 114 determines whether operation of the vehicle is within acceptable tolerance of the performance criterion. Poor operation of the vehicle can be due to sub-par performance of a driver of the vehicle as compared to other drivers, such as based on a comparison of the driver against the mean for drivers by looking up all the route segments that that the driver has traveled and comparing that driver's measurement data to the history of all drivers having traveled those route segments. For example, the driver may engage in aggressive acceleration and deceleration of the vehicle or other undesirable driving habits that can lead to reduced fuel efficiency, or increased stress on the vehicle that would lead to quicker deterioration of vehicle components or increased maintenance.

Alternatively, poor operation of the vehicle can be due to sub-par performance of a vehicle, such as based on a comparison of measurement data for the vehicle against measurement data of other vehicles, which can indicate whether or not the vehicle should be subject to maintenance.

The measurement data can also be used for comparing route segments against one another, to allow for route optimization.

The performance criterion can specify that measurement data of the vehicle indicative of driver performance should not deviate from the baseline 120 by greater than a specified threshold (or alternatively, should not exceed one or more standard deviations from a mean). Alternatively, or additionally, the performance criterion can specify that measurement data of the vehicle indicative of vehicle performance should not deviate from the baseline 120 by greater than a specified threshold (or alternatively, should not exceed one or more standard deviations from a mean).

The measurement data can be aggregated as follows:

| ∀ Drivers | ∀ Segments | ∀ Vehicles |
|---|---|---|
| ∃Route segment data | ∃Driver data | ∃Driver data |
| ∃Vehicle data | ∃Vehicle data | ∃Route segment data |

In an example, for all (V) driver records there exists (SI) some route segment data and some vehicle data. Therefore, it is possible to calculate a baseline for all or a subset of drivers across all or a subset of the segment data and across all or a subset of the vehicles, where appropriate. It should be noted that not all drivers will drive all vehicles and so the data that exists for each driver depends on which route segments (and categories of route segments) they have travelled and which vehicles (or types of vehicles) they have driven. All or a subset of the driver data by route segment (or category of route segment) or by vehicle or (category of vehicle) can be aggregated to calculate a baseline for each route segment or for each category of route segments, and a baseline for each vehicle or for each category of vehicle. Thereafter, when assessing a driver the received sensor data can be compared with one or more baselines to determine if the driver is driving within an acceptable tolerance of the one or more baselines.

It should be understood from the example above that is it also possible to determined different subsets of driver data. For example, it may be useful to compare a new driver with an aggregation of data from other new drivers and/or with an aggregation of data more experienced drivers. It may be useful to compare long haul drivers with baselines from other long haul drivers and short haul drivers with baselines from other short haul drivers, since short haul drivers would tend to have higher mean accelerometer readings than would long haul drivers.

Aggregating measurement data in this way means it is possible to normalize across the different data sets to identify variations, and where those variations deviate from the baseline by a sufficient degree or tolerance, that it is possible to identify a reason for the variations.

Aggregated vehicle data may be data from a specific vehicle or may be from a number of vehicles of a similar type or from same make and model, such as aggregating data of the vehicle(s) that has (have) traveled along route segments of the same or similar type (or category as noted above). In some cases, measurement data of the vehicle deviating from the baseline 120 by greater than the specified threshold may be due to either or both of poor driver performance or poor vehicle performance or terrain or other route segment characteristic. Thus, the vehicle operation assessment module 114 may not be able to determine based on just measurement data of one vehicle whether the poor operation of the vehicle is due to the driver or the vehicle itself.

For disambiguation, the vehicle operation assessment module 114 can further consider measurement data acquired by one or more other vehicles that are driven by the same driver. The vehicle operation assessment module 114 can use measurement data received from multiple vehicles (such as of the same make and model) driven by the same driver along the same one or more route segments or categories of segment types, and can compare the measurement data from the multiple vehicles to each other to determine whether the measurement data from the multiple vehicles are similar (to within some threshold), or whether the measurement data from the multiple vehicles differ (by greater than the threshold). If the measurement data from the multiple vehicles driven by the same driver are similar, then that may be an indication that the driver is engaging in poor driving habits leading to poor operation of the vehicle. More specifically, the measurement data received from the multiple vehicle driven by the driver may indicate that the driver has operated the multiple vehicles consistently with other drivers along the same one or more route segments.

On the other hand, if the measurement data from the multiple vehicles differ, then that may be an indication that the poor operation of the vehicle is due to a characteristic of the vehicle itself (e.g., the engine is poorly tuned, a vehicle component is worn or damaged, a tire is not properly inflated, etc.).

In response to determining that the of the vehicle is operating the vehicle poorly, the vehicle operation assessment module 114 can issue a notification to cause further training of the driver.

In further examples, in response to determining that the vehicle is performing poorly as compared to at least another vehicle, the vehicle operation assessment module 114 can issue a notification to cause maintenance or repair of the vehicle. The notification could additionally be provided to the driver in real-time to encourage improved driving.

In some examples, any of the foregoing notifications can be in the form of an email, a text, a popup banner, or any other form of indication that can be sent to a target entity, such as a human, a machine, or a program. The target entity can be associated with a fleet operator, for example.

In a more specific example, any of the foregoing notifications can be sent to a client device 130 that is coupled to the vehicle assessment system 100, such as over the network 102 or over a direct link. The client device 130 can be a user device, such as a notebook computer, desktop computer, tablet computer, smartphone, and so forth, which can be used by a user (e.g., a fleet administrator) to manage vehicles. The client device 130 can execute an application that allows the client device 130 to interface with the vehicle assessment controller 104. The application executed on the client device 130 can present a management graphical user interface (GUI) 132, which allows a user at the client device 130 to interact with the vehicle assessment controller 104.

In some examples, the management GUI 132 can be used by an administrator to manage the vehicles 101. The management GUI 132 allows the administrator to receive notifications regarding poor driver or vehicle performance, for example. The notifications can identify the drivers and/or vehicles exhibiting poor performance.

The route assessment module 116 compares the measurement data multiple vehicles to the baseline 120 to determine whether one or more route segments are undesirable according to a route criterion. The multiple vehicles may be driven by different drivers.

The route criterion for determining whether one or more route segments are undesirable comprises one or more of: a reduced performance criterion specifying that a route segment that causes a reduced performance of a vehicle as compared to another route segment is undesirable, an increased stress criterion specifying that a route segment that causes increased stress on a vehicle as compared to another route segment is undesirable, and an environment criterion specifying that a route segment associated with a harsher environment as compared to another route segment is undesirable or specifying that a route segment that is in an unsafe zone is undesirable.

As examples, the reduced performance criterion is based on one or more of fuel efficiency data and vehicle speed data. As an example, the reduced performance criterion can be used by the route assessment module 116 to determine that a route segment is undesirable if vehicles traveling the route segment exhibit lower fuel efficiency than a baseline fuel efficiency of vehicles traveling on one or more other route segments of a similar type. As another example, the reduced performance criterion can be used by the route assessment module 116 to determine that a route segment is undesirable if vehicles traveling the route segment have slower speeds than a baseline speed of vehicles traveling on one or more other route segments.

As examples, the increased stress criterion is based on one or more of acceleration data, terrain data, and vehicle speed data. Acceleration data can be used to determine whether a route segment has many twists and turns, or whether the route segment is rough (e.g., the route segment is unpaved or has potholes). As an example, the increased stress criterion can be used by the route assessment module 116 to determine that variations in the acceleration data (which can be indicative of twists and turns or a rough surface) exceeds a baseline variation of acceleration data of vehicles traveling on one or more other route segments.

Terrain data (such as terrain data based on images captured by cameras or can be derived from acceleration data or vibration data) or can be based on GPS data providing altitude information. As an example, the increased stress criterion can be used by the route assessment module 116 to determine that a terrain of the route segment is worse than a baseline terrain of one or more other route segments. A first terrain of a route segment is "worse" than a baseline terrain if the first terrain exhibits variations in depth (or along another dimension) that exceed corresponding variations in dimensions represented in the baseline terrain.

Vehicle speed data can also be used to determine stress on a vehicle. As an example, the vehicle speed data can be used by the route assessment module 116 to determine that a speed along a route segment is slower than a baseline speed of one or more other route segments. Slower speeds can cause a vehicle engine to run at a higher revolution per minute (RPM), which can lead to increased stress on the vehicle engine.

As examples, the environment criterion is based on one or more of temperature data, humidity data, pressure data, altitude data, and crime statistics data. Temperature data, humidity data, pressure data, and altitude data are examples of environmental data that define an environment of a route segment along which a vehicle is to pass. As an example, the environment criterion can specify that a route segment is undesirable if a temperature, humidity, pressure, and/or altitude of the route segment deviates by greater than a specified threshold from a baseline temperature, humidity, pressure, and/or altitude of one or more other route segments.

As another example, the environment criterion can specify that a route segment is undesirable if a crime measure that is based on crime statistics for the route segment indicate that the route segment is in a zone of higher crime than a baseline crime measure for one or more other route segments. An example of a crime measure can be any or some combination of the following: a quantity or rate of vehicle break-ins per given time period, a quantity or rate of robberies per given time period, a quantity or rate of assaults per given time period, or any other measure that provides an indication of crime in a zone.

Figure 2:
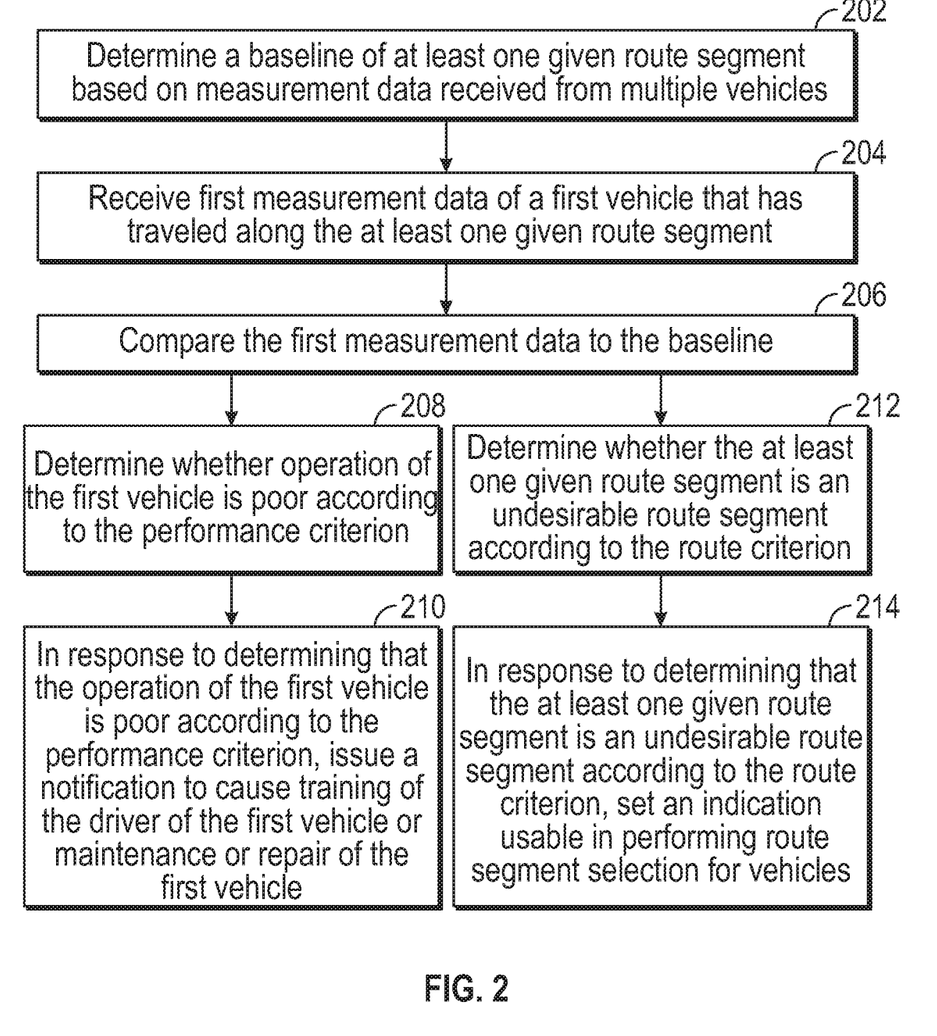
FIG. 2 is a flow diagram of a process according to some implementations of the present disclosure.

FIG. 2 is a flow diagram of an example process that can be performed by the vehicle assessment controller 104. The baseline calculator 112 of the vehicle assessment controller 104 determines (at 202) a baseline of at least one a given route segment based on measurement data received from multiple vehicles. As discussed above, the baseline can be calculated by aggregating measurement data acquired by multiple vehicles.

In some examples, the aggregation for calculating the baseline is based on measurement data received from multiple vehicles that have traveled along the same at least one given route segment (or route segments of the same type or category).

The vehicle assessment controller 104 receives (at 204) first measurement data of a first vehicle that has traveled along the at least one given route segment.

The vehicle assessment controller 104 (and more specifically, the vehicle operation assessment module 114 and the route assessment module 116) compares (at 206) the first measurement data to the baseline.

Based on the comparing, the vehicle operation assessment module 114 determines (at 208) whether operation of the first vehicle is poor according to the performance criterion (examples discussed above). The poor operation of the first vehicle can be due to poor driving by a driver of the first vehicle, and/or poor performance of the first vehicle. In response to determining that the operation of the first vehicle is poor according to the performance criterion, the vehicle operation assessment module 114 issues (at 210) a notification to cause training of the driver of the first vehicle or maintenance or repair of the first vehicle.

Based on the comparing, the route assessment module 116 determines (at 212) whether the at least one given route segment is an undesirable route segment according to the route criterion or criteria (examples discussed above). The determination of whether the at least one given route segment is an undesirable route segment can be based on measurement data acquired by multiple vehicles that have traveled the at least one given route segment.

In response to determining that the at least one given route segment is an undesirable route segment according to the route criterion, the route assessment module 116 sets (at 214) an indication usable in performing route segment selection for vehicles.

For example, the indication can include a priority indication specifying a relative priority of the at least one given route segment as compared to another route segment. A first route segment can be assigned a first priority indication, and a second route segment can be assigned a second priority indication. The relative values of the first and second priority indications indicate which of the first and second route segments has a higher priority for route selection purposes than the other route segment.

For example, when selecting route segments for a trip planned by a given vehicle, a route selector 150 (FIG. 1) (which can be implemented with one or more computers) can consider the priority indications of respective route segments to pick which route segments to use. Given two alternative route segments that can reach a target location, the route selector 150 can pick the higher priority route segment of the two alternative route segments to use in the route for the trip.

Figure 3:
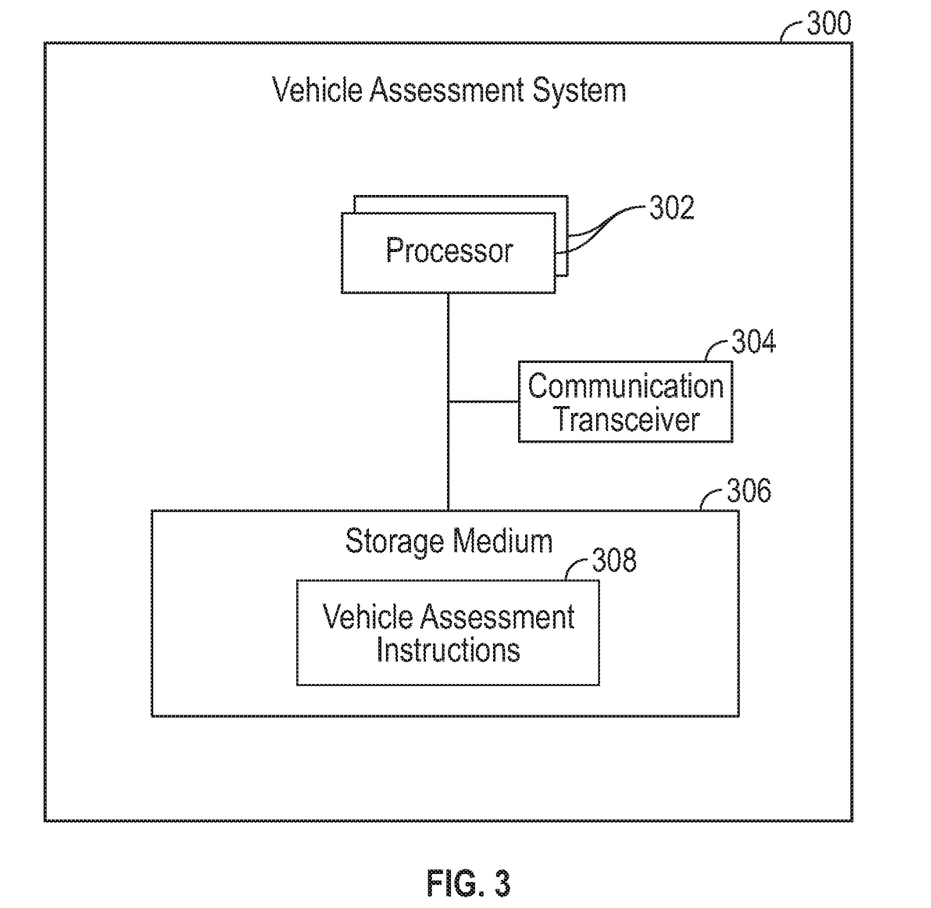
FIG. 3 is a block diagram of a vehicle assessment system according to some implementations of the present disclosure.

FIG. 3 is a block diagram of a vehicle assessment system 300 (similar to the vehicle assessment system 100 of FIG. 1) that can be implemented using one or more computers. The vehicle assessment system 300 includes one or more hardware processors 302. A hardware processor can include a microprocessor, a core of a multi-core microprocessor, a microcontroller, a programmable integrated circuit, a programmable gate array, a digital signal processor, or another hardware processing circuit.

The vehicle assessment system 300 further includes a communication transceiver 304 to communicate over a network. Additionally, the vehicle assessment system 300 includes a non-transitory machine-readable or computer-readable storage medium 306 that stores machine-readable instructions executable on a hardware processor 302. Machine-readable instructions executable on a hardware processor can refer to the instructions executable on a single hardware processor or the instructions executable on multiple hardware processors.

The machine-readable instructions include vehicle assessment instructions 308, which can perform tasks of the vehicle assessment controller 104 of FIG. 1, for example.

The storage medium 306 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    determine a baseline of at least one route segment based on measurement data received from a plurality of vehicles;
    receive first measurement data of a first vehicle that has traveled along the at least one route segment;
    compare the first measurement data to the baseline;
    based on the comparing,
        determine whether operation of the first vehicle is within an acceptable tolerance of a performance criterion,
        determine whether the at least one route segment is an undesirable route segment according to a route criterion, and
        in response to determining that the at least one route segment is an undesirable route segment according to the route criterion, assign a priority indication to the at least one route segment, wherein the priority indication specifies a relative priority of the at least one route segment as compared to another route segment; and
    perform, using the priority indication and priority indications of other route segments, a route selection to pick a route segment from a plurality of route segments for a trip of a given vehicle.

2. The non-transitory machine-readable storage medium of claim 1, wherein determining whether the at least one route segment is an undesirable route segment according to the route criterion is further based on measurement data received from at least a second vehicle that has traveled along the at least one route segment, and comparing the measurement data received from at least the second vehicle to the baseline.

3. The non-transitory machine-readable storage medium of claim 2, wherein the route criterion for determining whether the at least one route segment is an undesirable route segment comprises one or more of: a reduced performance criterion specifying that a route segment that causes a reduced performance of a vehicle as compared to another route segment is undesirable, an increased stress criterion specifying that a route segment that causes increased stress on a vehicle as compared to another route segment is undesirable, and an environment criterion specifying that a route segment associated with a harsher environment as compared to another route segment is undesirable or specifying that a route segment that is in an unsafe zone is undesirable.

4. The non-transitory machine-readable storage medium of claim 3, wherein:
    the reduced performance criterion is based on one or more of fuel efficiency data and vehicle speed data, or
    wherein the increased stress criterion is based on one or more of acceleration data, terrain data, and vehicle speed data.

5. The non-transitory machine-readable storage medium of claim 3, wherein the environment criterion is based on one or more of temperature data, humidity data, pressure data, and altitude data.

6. The non-transitory machine-readable storage medium of claim 1, wherein determining the baseline of the at least one route segment comprises aggregating the measurement data acquired by sensors on the plurality of vehicles.

7. The non-transitory machine-readable storage medium of claim 1, wherein the measurement data received from the plurality of vehicles comprises measurement data acquired by the plurality of vehicles when traveling the at least one route segment.

8. The non-transitory machine-readable storage medium of claim 1, wherein the measurement data received from the plurality of vehicles comprises measurement data acquired by the plurality of vehicles when traveling along one or more route segments categorized into a same category as the at least one route segment.

9. The non-transitory machine-readable storage medium of claim 1, wherein determining whether the operation of the first vehicle is within the acceptable tolerance of the performance criterion comprises determining that a driver of the first vehicle is operating the first vehicle in a sub-par manner as compared to other drivers.

10. The non-transitory machine-readable storage medium of claim 9, wherein determining that the driver of the first vehicle is operating the first vehicle in the sub-par manner comprises using measurement data received from a second vehicle driven by the driver along the at least one route segment and that the measurement data received from the second vehicle indicates an operating performance by the driver that is sub-par.

11. The non-transitory machine-readable storage medium of claim 1, wherein determining whether the operation of the first vehicle is within the acceptable tolerance of the performance criterion comprises determining that the first vehicle is performing in a sub-par manner resulting from improper maintenance or a defective vehicle component as compared to at least another vehicle.

12. The non-transitory machine-readable storage medium of claim 11, wherein determining that the first vehicle driven by a driver is performing in the sub-par manner comprises using measurement data received from a second vehicle driven by the driver along the at least one route segment and that the measurement data received from the second vehicle indicates that the driver has operated the first and second vehicles consistently with other drivers along the at least one route segment.

13. The non-transitory machine-readable storage medium of claim 11, wherein the instructions upon execution cause the system to:
    issue a notification to cause maintenance or repair of the first vehicle in response to determining that the first vehicle is performing in the sub-par manner.

14. The non-transitory machine-readable storage medium of claim 1, wherein the route selection comprises picking, using the priority indication of the at least one route segment and the priority indications of the other route segments, a higher priority route segment from multiple alternative route segments to use in a route for the trip.

15. The non-transitory machine-readable storage medium of claim 1, wherein the route criterion for determining whether the at least one route segment is an undesirable route segment comprises an environment criterion specifying that a route segment that is in an unsafe zone based on crime statistics data is undesirable.

16. The non-transitory machine-readable storage medium of claim 15, wherein the crime statistics data comprises one or more crime measures selected from among a quantity or rate of vehicle break-ins, a quantity or rate of robberies, or a quantity or rate of assaults.

17. A system comprising:
a processor; and
a non-transitory storage medium storing instructions executable on the processor to:
determine a baseline of at least one route segment based on measurement data received from a plurality of vehicles;
receive first measurement data of a first vehicle that has traveled along the at least one route segment;
compare the first measurement data to the baseline;
based on the comparing,
determine whether operation of the first vehicle is within an acceptable tolerance of a performance criterion,
in response to determining that the operation of the first vehicle is not within the acceptable tolerance of the performance criterion, cause training of a driver of the first vehicle or maintenance or repair of the first vehicle,
determine whether the at least one route segment is an undesirable route segment according to a route criterion, and
in response to determining that the at least one route segment is an undesirable route segment according to the route criterion, set a priority indication for the at least one route segment, wherein the priority indication specifies a relative priority of the at least one route segment as compared to another route segment; and
perform, using the priority indication and priority indications of other route segments, a route selection to pick a route segment from a plurality of route segments for a trip of a given vehicle.

18. The system of claim 17, wherein the route criterion for determining whether the at least one route segment is an undesirable route segment comprises an environment criterion specifying that a route segment that is in an unsafe zone based on crime statistics data is undesirable.

19. A method performed by a system comprising a hardware processor, comprising:
determining a baseline of at least one route segment based on measurement data received from a plurality of vehicles;
receiving first measurement data of a first vehicle that has traveled along the at least one route segment;
comparing the first measurement data to the baseline;
based on the comparing,
determining whether operation of the first vehicle is within an acceptable tolerance of a performance criterion,
determining whether the at least one route segment is an undesirable route segment according to a route criterion,
in response to determining that the at least one route segment is an undesirable route segment according to the route criterion, assigning a priority indication to the at least one route segment, wherein the priority indication specifies a relative priority of the at least one route segment as compared to another route segment; and
performing, using the priority indication and priority indications of other route segments, a route selection to pick a route segment from a plurality of route segments for a trip of a given vehicle.

20. The method of claim 19, wherein determining whether the operation of the first vehicle is within the acceptable tolerance of the performance criterion comprises determining that the first vehicle is performing in a sub-par manner resulting from improper maintenance or a defective vehicle component as compared to at least another vehicle, and
wherein determining that the first vehicle driven by a driver is performing in the sub-par manner comprises using measurement data received from a second vehicle driven by the driver along the at least one route segment and that the measurement data received from the second vehicle indicates that the driver has operated the first and second vehicles consistently with other drivers along the at least one route segment.

* * * * *